United States Patent
Carnevali

(10) Patent No.: US 9,831,904 B1
(45) Date of Patent: Nov. 28, 2017

(54) ADJUSTABLE CRADLE FOR MOBILE DEVICES AND METHODS OF MAKING AND USING

(71) Applicant: National Products, Inc., Seattle, WA (US)

(72) Inventor: Jeffrey D. Carnevali, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 15/379,213

(22) Filed: Dec. 14, 2016

(51) Int. Cl.
*H04M 1/06* (2006.01)
*G06F 1/16* (2006.01)
*H04B 1/3877* (2015.01)

(52) U.S. Cl.
CPC ......... *H04B 1/3877* (2013.01); *G06F 1/1632* (2013.01); *H04M 1/06* (2013.01)

(58) Field of Classification Search
CPC .............................. G06F 1/1632; H04M 1/06
See application file for complete search history.

(56) References Cited

U.S. PATENT DOCUMENTS

| | | |
|---|---|---|
| 809,977 A | 1/1906 | O'Brien |
| 1,786,459 A | 7/1926 | Simons |
| 2,495,552 A | 1/1950 | Schmitz |
| 2,549,917 A | 4/1951 | Millbrandt |
| 2,565,939 A | 8/1951 | Wriston |
| 2,612,947 A | 10/1952 | Jenks |
| 2,717,093 A | 9/1955 | Mautner |
| 2,803,368 A | 8/1957 | Koch |
| 3,018,525 A | 1/1962 | Deisenroth |
| 3,140,883 A | 7/1964 | Anthony |
| 3,464,579 A | 9/1969 | Asenbauer |
| 3,667,648 A | 6/1972 | Koziol |
| 3,885,701 A | 5/1975 | Becklin |
| 3,972,459 A | 8/1976 | Cooper |
| 3,978,830 A | 9/1976 | Toth, Jr. |
| 4,298,204 A | 11/1981 | Jinkins |
| 4,564,880 A | 1/1986 | Christ et al. |
| 4,607,772 A | 7/1986 | Hancock |
| 4,828,558 A | 5/1989 | Kelman |
| 4,842,174 A * | 6/1989 | Sheppard ............... B60R 11/02 108/45 |

(Continued)

FOREIGN PATENT DOCUMENTS

WO 2013/081222 6/2013

*Primary Examiner* — Lewis West
(74) *Attorney, Agent, or Firm* — Lowe Graham Jones PLLC; Bruce E. Black

(57) ABSTRACT

An adjustable cradle for mounting a mobile device includes a base having an attachment arrangement to removably attach the cradle to the mobile device or a case for the mobile device; and an arm adjustably extending from the base. The arm includes a roller disposed at an end of the arm opposite the base. The roller is configured and arranged to engage the mobile device or case to facilitate, in combination with the attachment arrangement of the base, retention of the attachment of the cradle to the mobile device or case. The adjustable cradle optionally includes a mount coupled to the base or mounting the cradle to a surface or for coupling to a mounting apparatus for mounting the cradle to the surface.

20 Claims, 5 Drawing Sheets

(56) References Cited

U.S. PATENT DOCUMENTS

| | | | |
|---|---|---|---|
| 4,845,738 A * | 7/1989 | Takano | H04M 1/2155 379/424 |
| 4,848,319 A | 7/1989 | Appeldorn | |
| 5,002,184 A | 3/1991 | Lloyd | |
| 5,096,317 A | 3/1992 | Phillippe | |
| 5,135,189 A | 8/1992 | Ghazizadeh | |
| 5,187,744 A * | 2/1993 | Richter | B60R 11/0241 224/553 |
| 5,246,133 A | 9/1993 | James | |
| 5,272,771 A | 12/1993 | Ansell et al. | |
| 5,295,602 A | 3/1994 | Swanson | |
| 5,353,934 A | 10/1994 | Yamauchi | |
| 5,535,274 A | 7/1996 | Braitberg et al. | |
| 5,584,054 A | 12/1996 | Tyneski et al. | |
| 5,586,002 A | 12/1996 | Notarianni | |
| 5,641,065 A | 6/1997 | Owens et al. | |
| 5,646,649 A | 7/1997 | Iwata et al. | |
| 5,791,506 A | 8/1998 | Sheffler et al. | |
| 5,813,096 A | 9/1998 | Soennichsen | |
| 5,822,427 A | 10/1998 | Braitberg et al. | |
| 5,842,670 A | 12/1998 | Nigoghosian | |
| 5,845,885 A | 12/1998 | Carnevali | |
| 5,860,550 A | 1/1999 | Miller et al. | |
| 5,895,018 A | 4/1999 | Rielo | |
| 5,953,795 A | 9/1999 | Bauer | |
| 5,969,057 A | 10/1999 | Schoeley et al. | |
| 5,990,674 A | 11/1999 | Tsumura et al. | |
| 5,992,807 A | 11/1999 | Tarulli | |
| 6,009,601 A | 1/2000 | Kaufman | |
| 6,010,005 A | 1/2000 | Reames et al. | |
| 6,032,910 A | 3/2000 | Richter | |
| 6,034,505 A * | 3/2000 | Arthur | H01M 2/1022 320/113 |
| 6,035,800 A | 3/2000 | Clifford | |
| 6,043,626 A | 3/2000 | Snyder et al. | |
| 6,068,119 A | 5/2000 | Derr et al. | |
| 6,149,116 A | 11/2000 | Won | |
| 6,273,773 B1 | 8/2001 | Bourke | |
| 6,276,552 B1 | 8/2001 | Vervisch | |
| 6,295,198 B1 | 9/2001 | Loh et al. | |
| 6,341,218 B1 | 1/2002 | Poplawsky et al. | |
| 6,356,053 B1 | 3/2002 | Sandoz et al. | |
| 6,377,825 B1 | 4/2002 | Kennedy et al. | |
| 6,406,758 B1 | 6/2002 | Bottari et al. | |
| 6,407,860 B1 | 6/2002 | Funazaki et al. | |
| 6,572,176 B2 | 6/2003 | Davies et al. | |
| 6,585,212 B2 | 7/2003 | Carnevali | |
| 6,588,637 B2 | 7/2003 | Gates et al. | |
| 6,614,423 B1 | 9/2003 | Wong et al. | |
| 6,646,864 B2 | 11/2003 | Richardson | |
| 6,648,376 B2 | 11/2003 | Christianson | |
| 6,702,604 B1 | 3/2004 | Moscovitch | |
| 6,762,585 B2 | 7/2004 | Liao | |
| 6,776,422 B1 | 8/2004 | Toy | |
| 6,785,566 B1 | 8/2004 | Irizarry | |
| 6,785,567 B2 | 8/2004 | Kato | |
| 6,816,713 B2 | 11/2004 | Chen | |
| 6,842,171 B2 | 1/2005 | Richter et al. | |
| 6,953,126 B2 | 10/2005 | Parker et al. | |
| 6,984,680 B2 | 1/2006 | Quinn | |
| 6,995,976 B2 | 2/2006 | Richardson | |
| 7,017,243 B2 | 3/2006 | Carnevali | |
| 7,031,148 B1 | 4/2006 | Lin | |
| 7,099,468 B1 * | 8/2006 | Shuniak | H04M 1/02 379/443 |
| 7,158,376 B2 | 1/2007 | Richardson et al. | |
| 7,180,735 B2 | 2/2007 | Thomas et al. | |
| 7,230,823 B2 | 6/2007 | Richardson et al. | |
| 7,248,901 B2 | 7/2007 | Peiker | |
| 7,257,429 B2 | 8/2007 | Kogan | |
| 7,283,849 B2 | 10/2007 | Peiker | |
| 7,311,526 B2 | 12/2007 | Rohrbach et al. | |
| 7,312,984 B2 | 12/2007 | Richardson et al. | |
| 7,351,066 B2 | 4/2008 | DiFonzo et al. | |
| 7,464,814 B2 | 12/2008 | Carnevali | |
| 7,480,138 B2 | 1/2009 | Kogan et al. | |
| 7,517,222 B2 | 4/2009 | Rohrbach et al. | |
| 7,520,369 B2 | 4/2009 | Lalouette | |
| 7,551,458 B2 | 6/2009 | Carnevali | |
| 7,594,576 B2 | 9/2009 | Chen et al. | |
| 7,609,512 B2 | 10/2009 | Richardson et al. | |
| 7,612,997 B1 | 11/2009 | Diebel et al. | |
| 7,641,477 B2 | 1/2010 | DiFonzo et al. | |
| 7,645,143 B2 | 1/2010 | Rohrbach et al. | |
| 7,663,879 B2 | 2/2010 | Richardson et al. | |
| 7,688,580 B2 | 3/2010 | Richardson et al. | |
| 7,812,567 B2 | 10/2010 | Shen | |
| 7,850,032 B2 | 12/2010 | Carnevali et al. | |
| 7,861,985 B2 * | 1/2011 | Galvin | F16M 11/40 248/160 |
| 7,889,489 B2 | 2/2011 | Richardson et al. | |
| 7,901,216 B2 | 3/2011 | Rohrbach et al. | |
| 7,907,394 B2 | 3/2011 | Richardson et al. | |
| 7,930,006 B2 * | 4/2011 | Neu | H04B 1/3877 361/679.02 |
| 8,061,516 B2 | 11/2011 | Carnevali | |
| 8,070,026 B2 | 12/2011 | Wadsworth et al. | |
| 8,074,951 B2 | 12/2011 | Carnevali | |
| 8,087,939 B2 | 1/2012 | Rohrbach et al. | |
| 8,099,138 B2 | 1/2012 | Piekarz | |
| 8,177,560 B2 | 5/2012 | Rohrbach et al. | |
| 8,183,825 B2 | 5/2012 | Sa | |
| 8,435,042 B2 | 5/2013 | Rohrbach et al. | |
| 8,453,835 B2 | 6/2013 | So | |
| 8,497,753 B2 | 7/2013 | DiFonzo et al. | |
| 8,690,582 B2 | 4/2014 | Rohrbach et al. | |
| 8,729,854 B2 | 5/2014 | Tsai et al. | |
| 8,801,441 B2 | 8/2014 | Zhang et al. | |
| 8,825,123 B1 | 9/2014 | Gudino | |
| 8,911,246 B2 | 12/2014 | Carnevali | |
| 8,929,065 B2 | 1/2015 | Williams | |
| 8,950,717 B2 | 2/2015 | Chuang | |
| 8,970,332 B2 | 3/2015 | DiFonzo et al. | |
| 9,112,304 B2 | 8/2015 | Rohrbach et al. | |
| 9,123,935 B2 | 9/2015 | Huang | |
| 9,172,781 B1 | 10/2015 | Goldstein | |
| 2004/0108348 A1 | 6/2004 | Barnes | |
| 2005/0189354 A1 | 9/2005 | Heather et al. | |
| 2006/0175766 A1 | 8/2006 | Carnevali | |
| 2009/0045087 A1 * | 2/2009 | Carnevali | H04M 1/04 206/320 |
| 2009/0189027 A1 * | 7/2009 | Brown | A61J 9/0692 248/104 |
| 2009/0314400 A1 | 12/2009 | Liu | |
| 2011/0021962 A1 * | 1/2011 | Sorrenti | A61F 5/3753 602/20 |
| 2012/0025684 A1 | 2/2012 | Trotsky | |
| 2012/0043235 A1 | 2/2012 | Klement | |
| 2012/0111881 A1 | 5/2012 | Gaddis, II et al. | |
| 2012/0118773 A1 | 5/2012 | Rayner | |
| 2012/0211382 A1 | 8/2012 | Rayner | |
| 2012/0250270 A1 | 10/2012 | Liu | |
| 2012/0261306 A1 | 10/2012 | Richardson et al. | |
| 2012/0298536 A1 | 11/2012 | Rauta et al. | |
| 2013/0001382 A1 | 1/2013 | Jang | |
| 2013/0092576 A1 | 4/2013 | Rayner | |
| 2013/0106353 A1 | 5/2013 | Foster | |
| 2013/0193006 A1 | 8/2013 | Bergreen et al. | |
| 2013/0220841 A1 | 8/2013 | Yang | |
| 2013/0258573 A1 | 10/2013 | Muday et al. | |
| 2013/0273983 A1 | 10/2013 | Hsu | |
| 2013/0288743 A1 * | 10/2013 | Hunt | F41G 11/004 455/556.1 |
| 2013/0300141 A1 | 11/2013 | Byrne | |
| 2013/0331156 A1 | 12/2013 | Lui | |
| 2013/0334071 A1 | 12/2013 | Carnevali | |
| 2015/0146401 A1 | 5/2015 | Su et al. | |
| 2015/0189780 A1 | 7/2015 | Su et al. | |
| 2015/0362824 A1 * | 12/2015 | Cunningham, III | F16M 13/04 396/423 |

* cited by examiner

ADJUSTABLE CRADLE FOR MOBILE DEVICES AND METHODS OF MAKING AND USING

FIELD

The present invention is directed to arrangements for mounting of a mobile device. The present invention is also directed to cradles for attachment to a mobile device or case for a mobile device to facilitate mounting of the device to a surface or other object.

BACKGROUND

Mobile devices, such as smartphones, cell phones, tablets, and other portable devices, are now ubiquitous. There is often a need or desire to mount these mobile devices to a surface so that the user can interact with the mobile device without holding the device. For example, in a car or boat, the user may wish to mount the device nearby for use or visual observation without requiring that the user hold the device. In such circumstances, there may be significant vibration or shock to the device or mount. The mounting arrangement for the device should be sufficient to retain the device despite the vibration or shock.

BRIEF SUMMARY

One embodiment is an adjustable cradle for mounting a mobile device. The cradle includes a base having an attachment arrangement to removably attach the cradle to the mobile device or a case for the mobile device; and an arm adjustably extending from the base. The arm includes a roller disposed at an end of the arm opposite the base. The roller is configured and arranged to engage the mobile device or case to facilitate, in combination with the attachment arrangement of the base, retention of the attachment of the cradle to the mobile device or case. The adjustable cradle optionally includes a mount coupled to the base or mounting the cradle to a surface or for coupling to a mounting apparatus for mounting the cradle to the surface.

In at least some embodiments, the arm includes a bent, flexible portion disposed between the roller and the base, the bent, flexible portion, when the cradle is attached to the mobile device or case, forms a bulge in the arm extending away from the mobile device or case. In at least some embodiments, the bent, flexible portion includes a plurality of panels coupled to each other by thinner regions. In at least some embodiments, when the cradle is attached to the mobile device or case, applying a force to the bent, flexible region towards the mobile device or case cases the arm to straighten and increases a distance between the roller and the base.

In at least some embodiments, the arm further includes a lateral ridge disposed on the arm and configured and arranged to contact the mobile device or case when the cradle is attached to the mobile device or case. In at least some embodiments, the roller is configured and arranged to freely rotate relative to a remainder of the arm.

In at least some embodiments, the arm includes a track arranged along a portion of the arm and the base includes a track interaction region, wherein the track and track interaction region are configured and arranged for adjustment of a position of the arm relative to the base and, when engaged, to maintain the position of the arm relative to the base absent a force applied to disengage the track from the track interaction region. In at least some embodiments, the track and the track interaction region include a sawtooth configuration.

In at least some embodiments, the attachment arrangement includes a sliding shoe arrangement configured and arranged to fit within a sliding shoe receptacle on the mobile device or case. In at least some embodiments, the attachment arrangement includes a platform separated from a remainder of the base by sidewalls, where the sidewalls form at least one undercut region beneath the platform. In at least some embodiments, the attachment arrangement further includes a detent on the platform or spaced apart from the platform.

In at least some embodiments, the attachment arrangement includes a receptacle separated from a remainder of the base by sidewalls, where the sidewalls form at least one undercut region between the receptacle and the remainder of the base. In at least some embodiments, the attachment arrangement further includes a ridge disposed within the receptacle.

Another embodiment is a system for mounting a mobile device. The system includes an adjustable cradle having a base including an attachment arrangement, an arm adjustably extending from the base and including a roller disposed at an end of the arm opposite the base, and, optionally, a mount coupled to the base for mounting the cradle to a surface or for coupling to a mounting apparatus for mounting the cradle to the surface. The system also includes a case for the mobile device to receive the mobile device within a cavity defined within the case. The case includes a case attachment arrangement to removably attach to the attachment arrangement of the cradle, where the roller of the cradle is configured and arranged to engage the case to facilitate, in combination with the attachment arrangement of the base, retention of the attachment of the case to the cradle.

In at least some embodiments, the attachment arrangement of the cradle includes a platform separated from a remainder of the base by platform sidewalls, where the platform sidewalls form at least one undercut region beneath the platform; and the case attachment arrangement includes a receptacle separated from a remainder of the case by receptacle sidewalls to receive the platform of the attachment arrangement of the cradle, where the receptacle sidewalls form at least one undercut region between the receptacle and the remainder of the case. In at least some embodiments, the attachment arrangement of the cradle further includes a detent spaced apart from the platform and the case attachment arrangement further includes a ridge disposed within the receptacle to engage the detent.

In at least some embodiments, the case attachment arrangement includes a platform separated from a remainder of the base by platform sidewalls, where the platform sidewalls form at least one undercut region beneath the platform; and the attachment arrangement of the cradle includes a receptacle separated from a remainder of the base of the cradle by receptacle sidewalls to receive the platform of the case attachment arrangement, where the receptacle sidewalls form at least one undercut region between the receptacle and the remainder of the base of the cradle.

In at least some embodiments, the system further includes a mounting apparatus to couple to the mount of the cradle and to mount the system on a surface.

Yet another embodiment is a system for mounting a mobile device. The system includes an adjustable cradle having a base including an attachment arrangement, an arm adjustably extending from the base and including a roller disposed at an end of the arm opposite the base, and, optionally, a mount coupled to the base for mounting the cradle to a surface or for coupling to a mounting apparatus for mounting the cradle to the surface. The system also includes a mobile device having a mobile device attachment arrangement to removably attach to the attachment arrangement of the cradle, where the roller is configured and arranged to engage the mobile device to facilitate, in combination with the attachment arrangement of the base, retention of the attachment of the mobile device to the cradle.

In at least some embodiments, the system further includes a mounting apparatus to couple to the mount of the cradle and to mount the system on a surface.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to arrangements for mounting of a mobile device. The present invention is also directed to cradles for attachment to a mobile device or case for a mobile device to facilitate mounting of the device to a surface or other object.

A cradle can be securely attached to a mobile device or a case of a mobile device and the cradle can include a mount that can be attached to a mounting device so that the mobile device can be mounted to a surface. For example, the cradle can facilitate mounting the mobile device in a motor vehicle or boat and is designed to retain the device despite vibration or shock to the mount. The cradle can be attached to the mobile device or case using any suitable coupling arrangement. The cradle also includes a roller attached to an arm so that the roller can extend over another surface (for example, a side surface or front surface) of the mobile device or case to more securely maintain the attachment between the cradle and the mobile device or case. The roller may be easier to engage or disengage from, or cause less damage to, a mobile device or case than other securing elements, such as latches or lips. The cradle further includes a mount that can be attached to a mounting device or the cradle can include the entire mounting device.

Figure 1A:
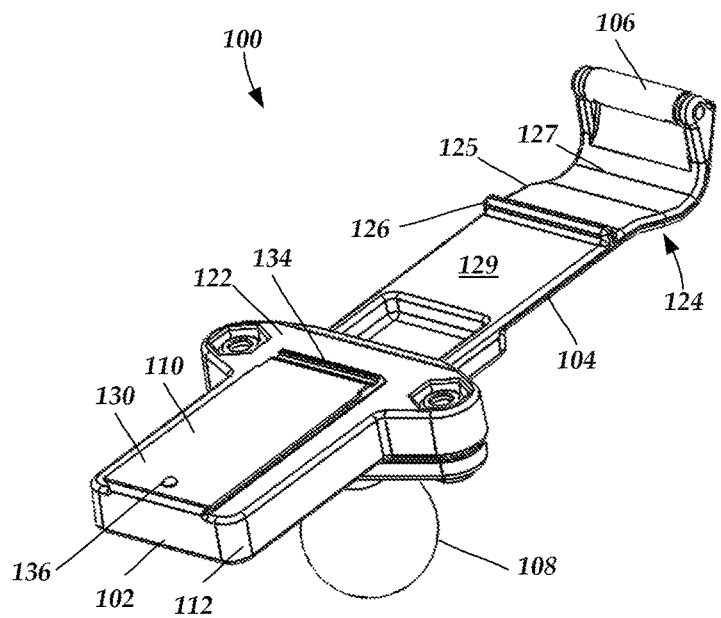
FIG. 1A is a schematic perspective view of one embodiment of a cradle for a mobile device, according to the invention.
Figure 1B:
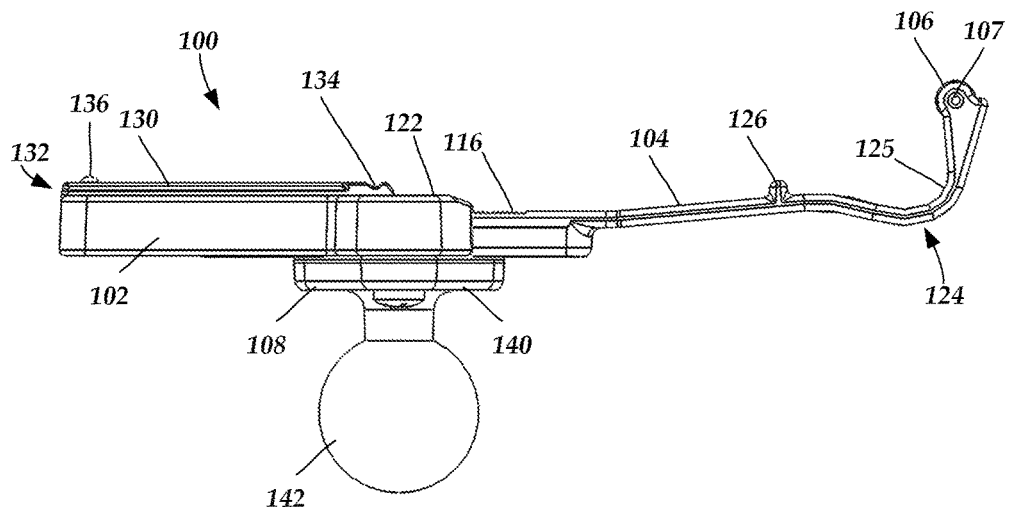
FIG. 1B is a schematic side view of the cradle of FIG. 1A, according to the invention.
Figure 1C:
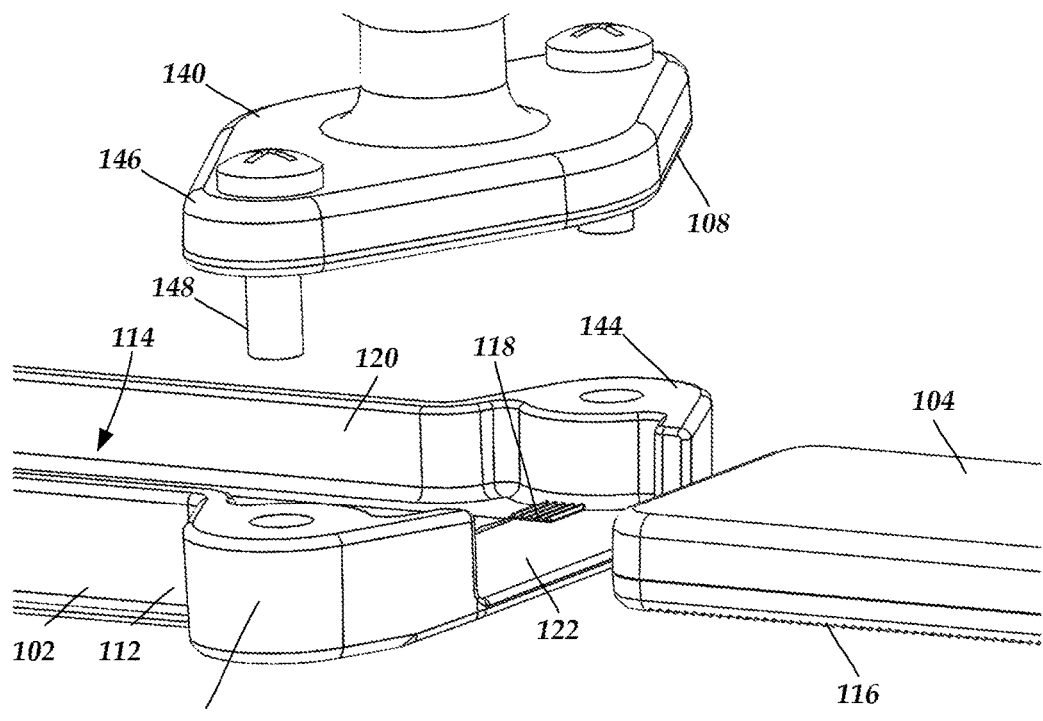
FIG. 1C is a schematic exploded view of a portion of the cradle of FIG. 1A, according to the invention.
Figure 2A:
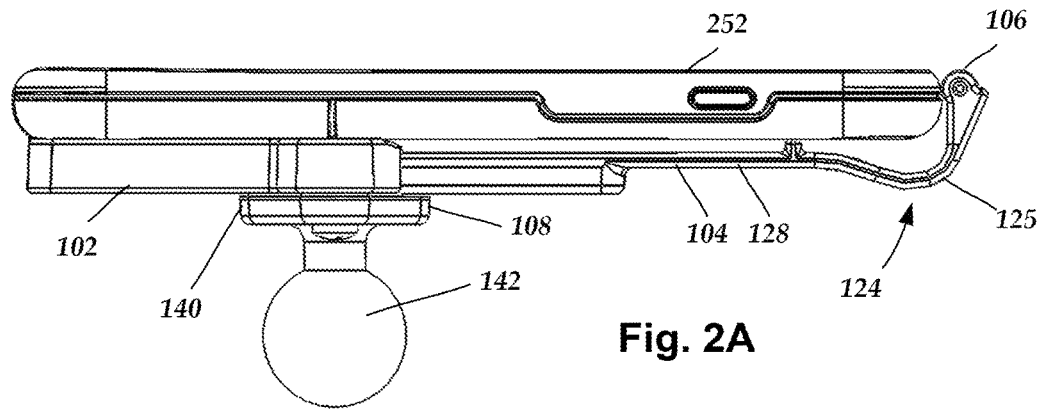
FIG. 2A is a schematic side view of the cradle of 1A attached to a case of a mobile device, according to the invention.
Figure 2B:
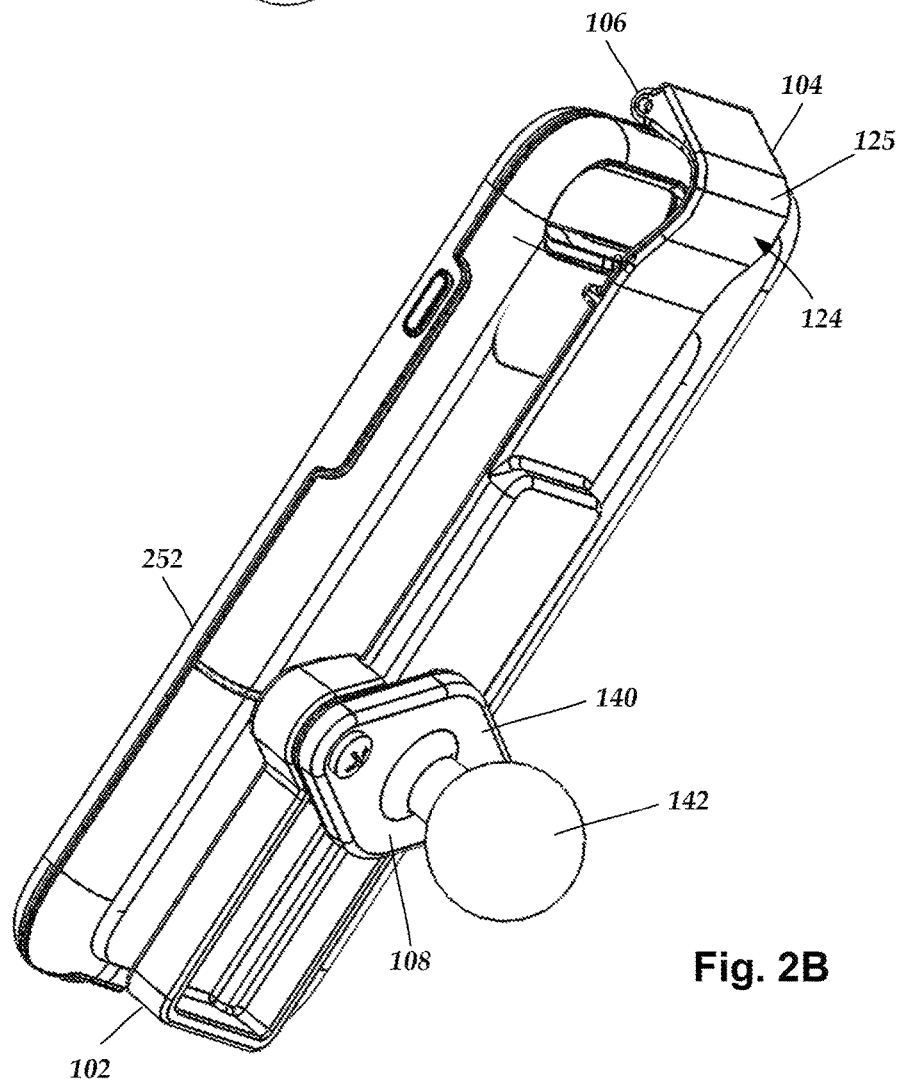
FIG. 2B is a schematic perspective view of the cradle of 1A attached to a case of a mobile device, according to the invention.

FIGS. 1A-1C illustrate one embodiment of an adjustable cradle 100 that includes a base 102, an arm 104, a roller 106, and an optional mount 108. FIGS. 2A and 2B illustrate a case 252 of a mobile device attached to the cradle 100. The case may be a skin, cover, or any other holder of the mobile device. It will be understood that instead of attaching a case to the cradle, in other embodiments, the mobile device may be attached directly to the cradle. Any suitable mobile device can be attached to the cradle, with or without a case, including, but not limited to, smartphones, cell phones, tablets, portable computers, or other portable devices. In at least some embodiments, the cradle 100 is adjustable so that it can be used with different mobile devices such as, for example, different smartphones or other cell phones or tablets. In some embodiments, different cradles 100 may be used with different types of devices. For example, one cradle may be suitable for many or all smartphones, but a different cradle will be used for tablets or portable computers. The base 102 and arm 104 can be made of any suitable materials and may be made of the same or different materials. Suitable materials include, but are not limited to, metal, thermoplastics, other polymeric materials, or any combination thereof.

The base 102 has an attachment arrangement 110 for attaching a case (e.g., case 252) or mobile device to the cradle and a housing 112 on which the attachment arrangement 110 is disposed. The housing 112 defines a cavity 114 (FIG. 1C) within which a portion of the arm 104 is received. The arm 104 and base 102 are arranged so that a portion of the arm can slide into and out of the cavity 114 in the base to adjust the length of the cradle 100. Such an arrangement can permit the cradle to be used with mobile devices of different lengths or may facilitate coupling of the cradle to the mobile device or case.

In the illustrated embodiment, a portion of the arm 104 includes a track 116 and the base 102 includes a corresponding track interaction region 118, as illustrated in FIG. 1C. The track 116 and track interaction region 118 allow the arm to be extended or retracted relative to the base, but also the track and track interaction region can interlock, or otherwise interact, with each other to maintain the arm 104 and base 102 in a desired position relative to each other. For example, the track 116 can have a sawtooth configuration with a corresponding sawtooth arrangement in the track interaction region 118 of the base. (Any other suitable pair of complementary shapes could also be used.) In such an arrangement, to move the arm 104, the teeth of the track 116 can be disengaged from, or moved over, the teeth of the track interaction region of the base 102. When the desired arm length is reached, the teeth of the track 116 are engaged with the teeth of the track interaction region 118 to maintain the desired arm length. In at least some embodiments, the arm 104 and base 102 (and optionally the mount 108) are arranged so that these elements are biased toward maintaining the engagement of the track 116 with the track interaction region 118 and, therefore, require application of a force to disengage the track 116 and track interaction region 118 to move the arm relative to the base. It will be understood that other mechanisms for moving the arm 104 relative to the base 102 and maintaining a position of the arm relative to the base can be used. Preferably, such a mechanism will fix the position of the arm relative to the base absent application of a force to disengage the arm from the base. In at least some embodiments, the track 116 of the arm 104 (or the arm itself) may include an end stop that prevents or inhibits full disengagement of the arm 104 from the base 102.

In the illustrated embodiment, the mount 108 is disposed over a portion of the cavity 114 of the base 102 and inhibits separation of the arm 104 from the base 102. Alternatively or additionally, the sidewalls 120 of base 102 which partially define the cavity 104 may have a lip, opposite a plate 122, which also partially defines the cavity, in order to retain a portion of the arm 104 within the cavity 114 and prevent or inhibit full separation of the arm from the base. In yet other embodiments, instead of a lip, a second plate may be disposed over and between the sidewalls 120 to more fully enclose the cavity 114 of the base 102 and retain a portion of the arm 104 within the cavity.

The arm 104 extends from the base 102 to the roller 106 and can be adjusted so that the distance between the base 102 and roller 106 can vary. The arm 104 can optionally include an axle 107 or other mechanism that attaches the roller 106 to the arm, but also allows the roller to rotate. The roller 106 can be made of any suitable material including, but not limited to, metal, thermoplastic, or any combination thereof. In at least some embodiments, the roller 106 may be coated with, or made of, a material that is flexible, resilient, or soft to prevent or reduce damage to the mobile device or case.

Preferably, the arm 104 includes a bent, flexible portion 124 near the roller. The bent, flexible portion 124 is arranged so that, when the cradle 100 is attached to the mobile device or case, the bent, flexible portion 124 forms a bulge away from the mobile device or case. Preferably, the bent, flexible portion 124 is resilient and biased to return to its initial bent configuration. In the illustrated embodiment, the bent, flexible portion 124 is made of several panels 125 coupled together by thinner regions 127, as illustrated in FIG. 1A, but other arrangements (including arrangements with uniform thickness) can be used.

This bent, flexible portion 124 can facilitate coupling the cradle 100 to a mobile device and uncoupling the cradle from the mobile device. For example, when the cradle 100 is attached to a mobile device or case 252, as illustrated in FIGS. 2A and 2B, pushing the bent, flexible portion 124 can cause the bent, flexible portion to at least partially straighten and increase the distance between the base 102 and the roller 106. This can facilitate disengaging or moving the roller 106 from the front or side surface of the mobile device or case 252 (FIGS. 2A and 2B) to a position along the back surface of the mobile device (FIG. 4B) as part of disengaging the cradle 100 from the mobile device or case (or repositioning the cradle).

Conversely, during attachment of the cradle 100 to the mobile device or case 252 pushing the bent, flexible portion 124 can cause the bent, flexible portion to at least partially straighten. This can facilitate moving the roller 106 from a position along the back surface of the mobile device (see, FIG. 4B) to a position along the top surface (FIGS. 2A and 2B) or front surface of the mobile device. When the pushing force is released, the flexible, bent portion 124 is biased to return to the initial bent configuration and can, thereby, engage the mobile device or case with a force that retains the device in contact with the cradle 100, as illustrated in FIGS. 2A and 2B.

The arm 104 also optionally includes a ridge 126 that extends away from the surface 129 of the arm. When the cradle 100 is coupled to the mobile device or case 252, as illustrated in FIGS. 2A and 2B, the ridge can engage the back surface of the mobile device or case 252. In at least some embodiments, the ridge 126 facilitates maintaining a relatively straight arrangement of a portion 128 (FIG. 2A) of the arm 102 with respect to the case 252.

An attachment arrangement 110 is disposed on the base 102 as the primary mechanism for attaching the mobile device or case 252 to the cradle 100. In the illustrated embodiment, the attachment arrangement 110 has the form of a sliding shoe receptacle that is configured to attach to a corresponding arrangement on the mobile device or case attached to the mobile device. It will be understood that other attachment arrangements can also be used.

The illustrated attachment arrangement 110 includes a platform 130 with two opposing undercut regions 132 (FIG. 1B) running along opposite sides of the platform so that the platform flares outwardly above the undercut regions. The attachment arrangement also includes a detent 134 located near another side of the platform 130 and may be part of the platform or spaced apart from the platform.

Figure 3:
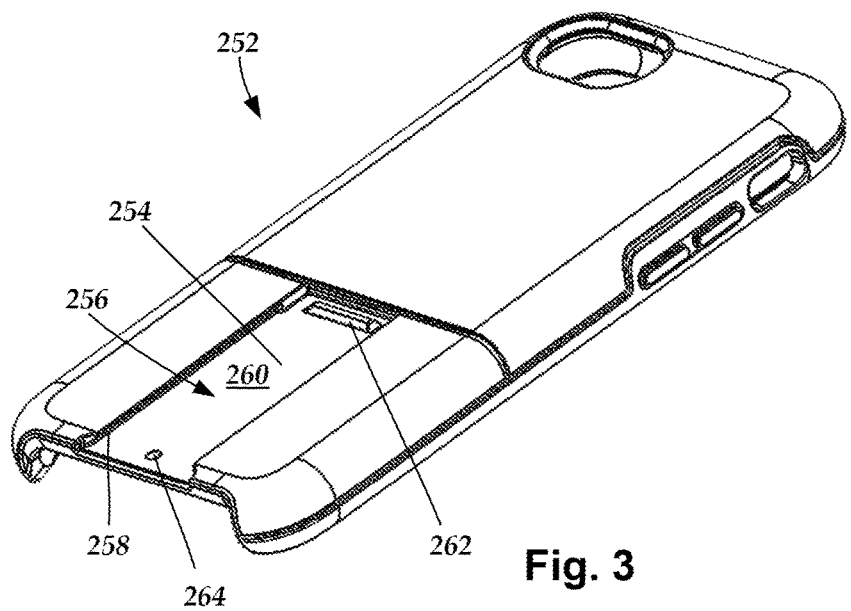
FIG. 3 is a schematic perspective back view of a case for a mobile device for use with the cradle of FIG. 1A, according to the invention.
Figure 4A:
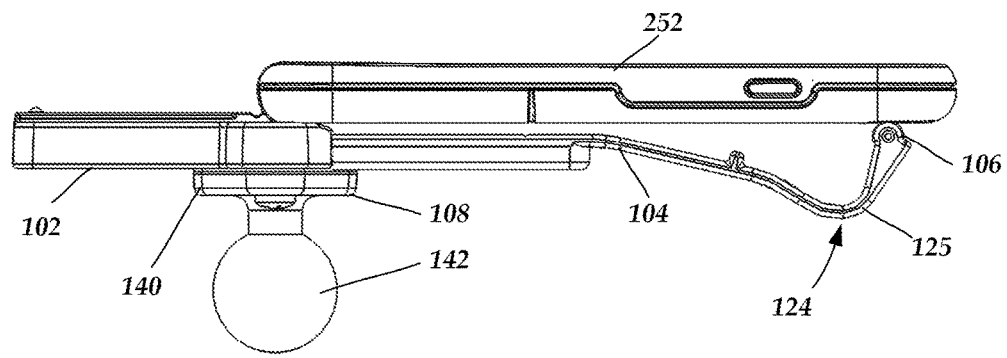
FIG. 4A is a schematic side view of the cradle of FIG. 1A prior to complete attachment to a case of a mobile device, according to the invention.
Figure 4B:
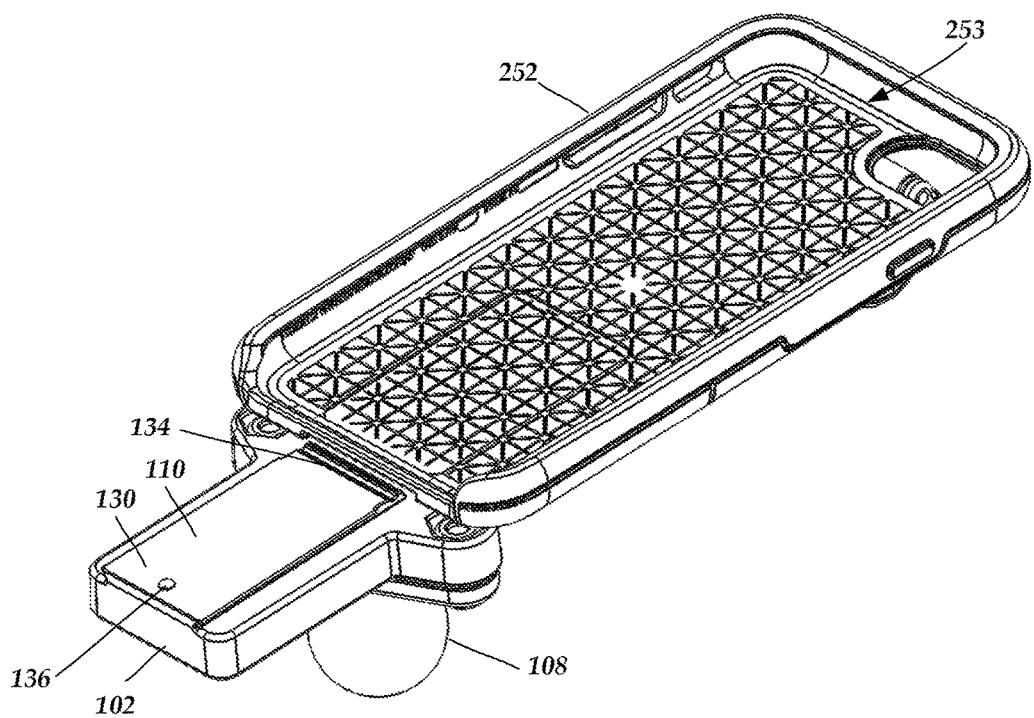
FIG. 4B is a schematic perspective top view of the cradle of FIG. 1A prior to complete attachment to a case of a mobile device, according to the invention.

FIG. 3 illustrates a case 252 that includes an attachment arrangement 254 for attaching to the attachment arrangement 110 of the cradle 100. It will be understood that the case 252 (or skin or other cover) can be a case for a mobile device or that, instead of a case, the mobile device includes the attachment arrangement 254. The case 252 includes a device cavity 253 (FIG. 4B)

The attachment arrangement 254 defines a cavity 256 sized to receive the platform 130 of the cradle 100. The cavity 256 has sidewalls 258 that flare inwardly to produce undercut regions between the top of the sidewalls and the floor 260. In this manner, when the platform 130 of the cradle 100 is slid into the cavity 256 of the case 252, the undercut regions 132 of the cradle receive the flared portions of the sidewalls 258 of the case and the flared edges of the platform 130 are received in the undercut regions of the sidewalls 258 of the case to form an interlocked arrangement for holding the platform 130 within the cavity 256. It will be recognized that, in at least some other embodiments, the case (or mobile device) can include the platform and associated elements and the cradle can include the cavity and associated elements. FIGS. 4A and 4B illustrate the case 252 and cradle 100 prior to insertion of the platform 130 into the cavity 256 to couple the cradle to the case.

In addition, the attachment arrangement 254 of the case 252 optionally includes a ridge 262 that can engage the detent 134 of the attachment arrangement 110 of the cradle 100 to inhibit sliding of the platform 130 out of the cavity 256. It will be understood that in alternative embodiments, a detent can be disposed on the case and a ridge on the cradle.

In the illustrated embodiment, there is also an optional protrusion 136 on the platform 130 and a corresponding optional depression 264 in the floor 260 of the cavity 256 of the case 252. When the platform 130 is fully disposed in the cavity 256, the protrusion 136 fits into the depression 264 to inhibit sliding of the platform 130 out of the cavity 256. It will be understood that the protrusion can instead be positioned within the cavity and the depression can be positioned on the platform. It will also be recognized that there may be multiple protrusions and depressions.

A mount 108 is optionally attached to the cradle 100. In the illustrated embodiment, the mount 108 is attached to the base 102. The mount 108 includes a mounting base 140 and mounting ball 142 (FIG. 1B) extending from the mounting base. In the illustrated embodiment, the mount 108 and base 102 include flanges 144, 146 that are attached together using one or more fasteners 148, such as a screw, bolt or other fastening device. The mounting ball 142 can be made of any suitable material including, but not limited to, metal or plastic materials. In some embodiments, the mounting ball 142 may be resilient to permit compressively coupling the mounting ball to a mounting device.

Figure 5:
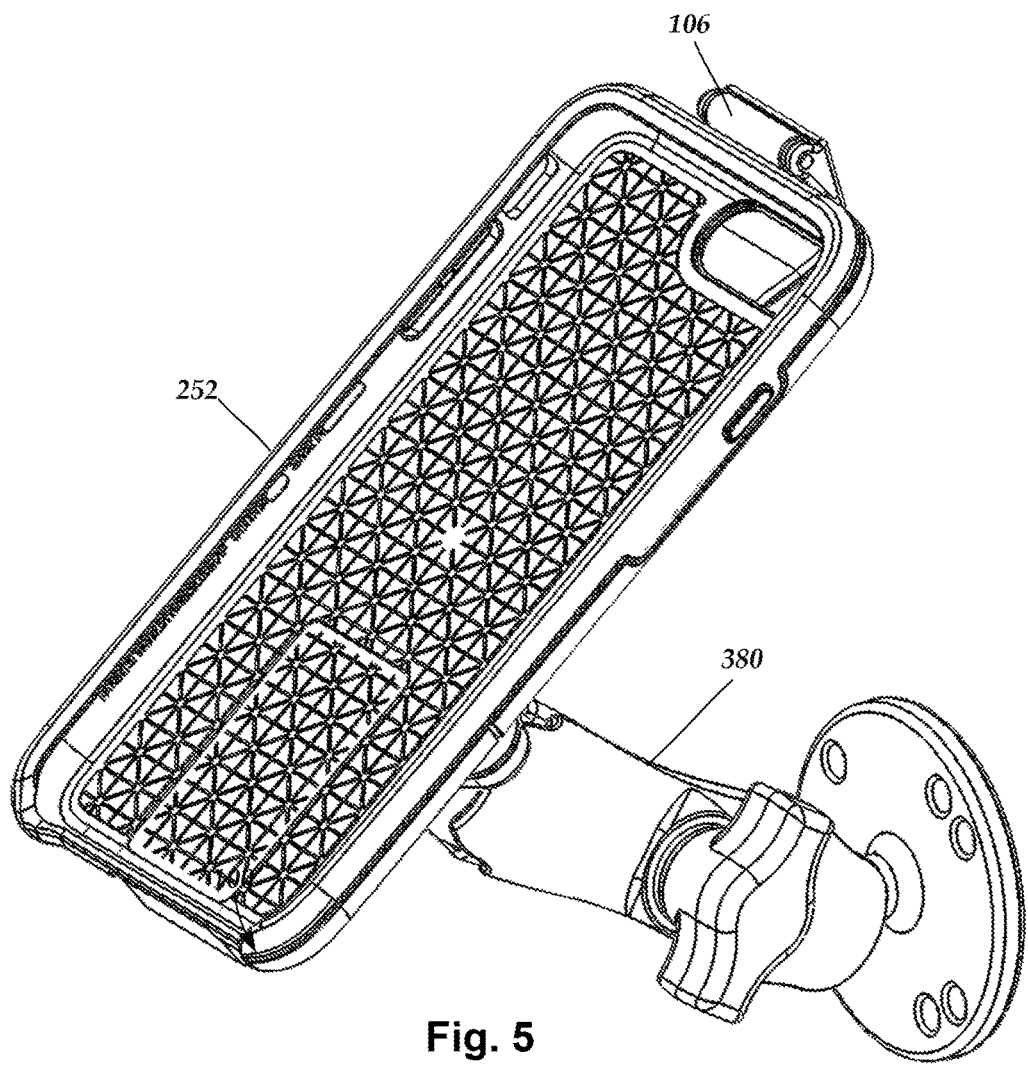
FIG. 5 is a schematic perspective view of a case of a mobile device coupled to a mounting device using the cradle of FIG. 1A, according to the invention.

It will be recognized that other mounting arrangement, including all or part of a mounting device, can be used in place of the mounting ball. FIG. 5 illustrates one example of a mounting device 380 that can be attached to the cradle 100 or to the mounting ball 142 of the cradle 100. Examples of such mounting devices, as well as mounts that can be used for mount 108 in conjunction with a mounting device, are described at U.S. Pat. Nos. 5,845,885; 6,561,476; 7,320,50; 7,997,554; 8,454,178; 8,505,861, RE42,060; RE42,581; and RE43,806, all of which are incorporated herein by reference, and are commercially as RAM® Mounts from National Products, Inc. It will be recognized that other mounts can also be used. In some embodiments, the entire mounting device 380 can be part of the cradle 100.

The above specification, examples and data provide a description of the manufacture and use of the composition of the invention. Since many embodiments of the invention can be made without departing from the spirit and scope of the invention, the invention also resides in the claims hereinafter appended.

What is claimed as new and desired to be protected by Letters Patent of the United States is:

1. An adjustable cradle for mounting a mobile device, the cradle comprising:
   a base comprising an attachment arrangement configured and arranged to removably attach the cradle to the mobile device or a case for the mobile device;
   an arm extending from the base and slidably adjustable relative to the base to adjust a length of the cradle, the arm comprising a roller disposed at an end of the arm opposite the base, wherein the roller is configured and arranged to engage the mobile device or case to facilitate, in combination with the attachment arrangement of the base, retention of the attachment of the cradle to the mobile device or case; and
   a mount coupled to the base and configured and arranged for mounting the cradle to a surface or for coupling to a mounting apparatus for mounting the cradle to the surface.

2. The adjustable cradle of claim 1, wherein the arm comprises a bent, flexible portion disposed between the roller and the base, the bent, flexible portion, when the cradle is attached to the mobile device or case, forms a bulge in the arm extending away from the mobile device or case.

3. The adjustable cradle of claim 2, wherein the bent, flexible portion comprises a plurality of panels coupled to each other by thinner regions.

4. The adjustable cradle of claim 2, wherein, when the cradle is attached to the mobile device or case, applying a three to the bent, flexible portion towards the mobile device or case cases the arm to straighten and increases a distance between the roller and the base.

5. The adjustable cradle of claim 1, wherein the arm further comprises a lateral ridge disposed on the arm and configured and arranged to contact the mobile device or case when the cradle is attached to the mobile device or case.

6. The adjustable cradle of claim 1, wherein the roller is configured and arranged to freely rotate relative to a remainder of the arm.

7. The adjustable cradle of claim 1, wherein the arm comprises a track arranged along a portion of the arm and the base comprises a track interaction region, wherein the track and track interaction region are configured and arranged for adjustment of a position of the arm relative to the base and, when engaged, to maintain the position of the arm relative to the base absent a force applied to disengage the track from the track interaction region.

8. The adjustable cradle of claim 7, wherein the track and the track interaction region comprise a sawtooth configuration.

9. The adjustable cradle of claim 1, wherein the attachment arrangement comprises a sliding shoe arrangement configured and arranged to fit within a sliding shoe receptacle on the mobile device or case.

10. The adjustable cradle of claim 1, wherein the attachment arrangement comprises a platform separated from a remainder of the base by sidewalls, wherein the sidewalls form at least one undercut region beneath the platform.

11. The adjustable cradle of claim 10, wherein the attachment arrangement further comprises a detent on the platform or spaced apart from the platform.

12. The adjustable cradle of claim 1, wherein the attachment arrangement comprises a receptacle separated from a remainder of the base by sidewalls, wherein the sidewalls form at least one undercut region between the receptacle and the remainder of the base.

13. The adjustable cradle of claim 10, wherein the attachment arrangement further comprises a ridge disposed within the receptacle.

14. A system for mounting a mobile device, the system comprising:
   an adjustable cradle comprising
      a base comprising an attachment arrangement,
      an arm adjustably extending from the base, the arm comprising a roller disposed at an end of the arm opposite the base, and
      a mount coupled to the base and configured and arranged for mounting the cradle to a surface or for coupling to a mounting apparatus for mounting the cradle to the surface; and
   a case for the mobile device configured and arranged to receive the mobile device within a cavity defined within the case, the case defining a back and at least one side extending from the back, the case comprising
      a case attachment arrangement, wherein the roller is configured and arranged to engage the case to facilitate, in combination with the attachment arrangement of the base, retention of the attachment of the case to the cradle and the attachment arrangement of the adjustable cradle is configured and arranged to removably attach to the case attachment arrangement so that the base and attachment arrangement solely engage a surface of the case when removably attached.

15. The system of claim 14, wherein the attachment arrangement of the cradle comprises a platform separated from a remainder of the base by platform sidewalls, wherein the platform sidewalls form at least one undercut region beneath the platform; wherein the case attachment arrangement comprises a receptacle separated from a remainder of the case by receptacle sidewalls and configured and arranged to receive the platform of the attachment arrangement of the cradle, wherein the receptacle sidewalls form at least one undercut region between the receptacle and the remainder of the case.

16. The system of claim 15, Wherein the attachment arrangement of the cradle further comprises a detent spaced apart from the platform and the case attachment arrangement further comprises a ridge disposed within the receptacle and configured and arranged to engage the detent.

17. The system of claim 14, wherein the case attachment arrangement comprises a platform separated from a remainder of the case by platform sidewalls, wherein the platform sidewalls form at least one undercut region beneath the platform; wherein the attachment arrangement of the cradle comprises a receptacle separated from a remainder of the base of the cradle by receptacle sidewalls and configured and arranged to receive the platform of the case attachment arrangement, wherein the receptacle sidewalls form at least one undercut region between the receptacle and the remainder of the base of the cradle.

18. The system of claim 14, further comprising a mounting apparatus configured and arranged to couple to the mount of the cradle and to mount the system on a surface.

19. A system for mounting a mobile device, the system comprising:
   an adjustable cradle comprising
      a base comprising an attachment arrangement,
      an arm adjustably extending from the base, the arm comprising a roller disposed at an end of the arm opposite the base, and
      a mount coupled to the base and configured and arranged for mounting the cradle to a surface or for coupling to a mounting apparatus for mounting the cradle to the surface; and
   a mobile device defining a back, a front and at least one side extending between the front and the back, the mobile device comprising
      a mobile device attachment arrangement, wherein the roller is configured and arranged to engage the mobile device to facilitate, in combination with the attachment arrangement of the base, retention of the attachment of the mobile device to the cradle and the attachment arrangement of the adjustable cradle is configured and arranged to removably attach to the mobile device attachment arrangement so that the base and attachment arrangement solely engage the back of the mobile device when removably attached.

20. The system of claim 19, further comprising a mounting apparatus configured and arranged to couple to the mount of the cradle and to mount the system on a surface.

* * * * *